Nov. 20, 1934.　　　H. C. HAYES　　　1,980,993
VIBRATION DETECTOR
Filed May 17, 1928　　2 Sheets-Sheet 1
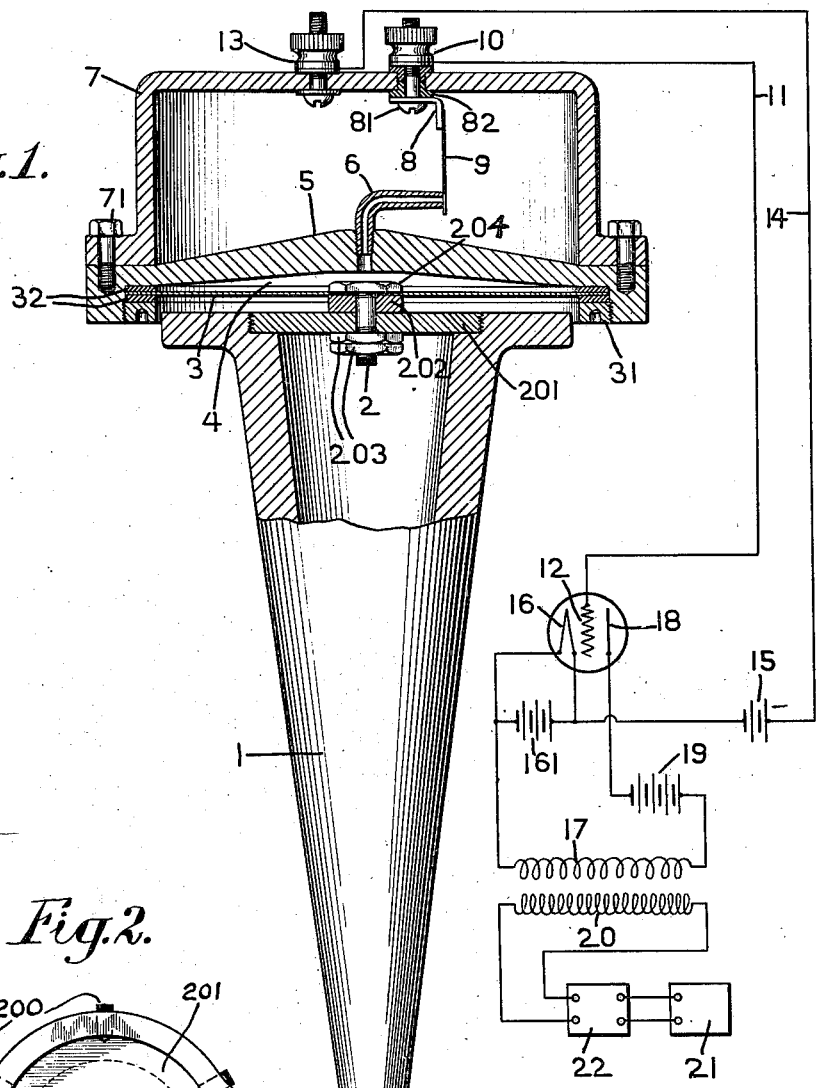
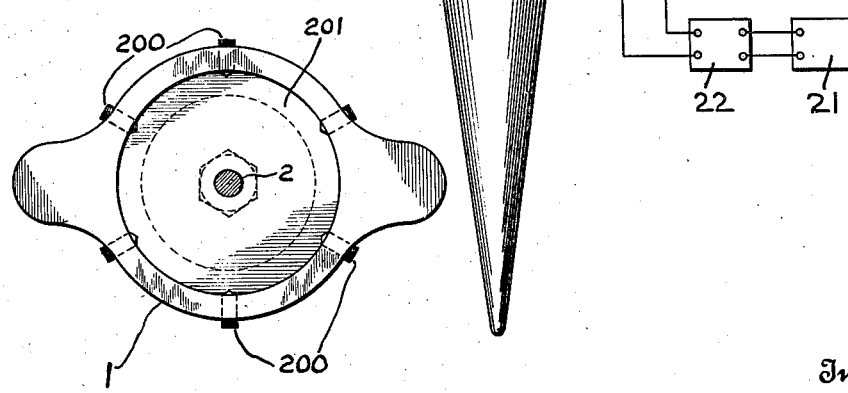
Inventor
Harvey C. Hayes
By Attorney Nov. 20, 1934.  H. C. HAYES  1,980,993
VIBRATION DETECTOR
Filed May 17, 1928   2 Sheets-Sheet 2
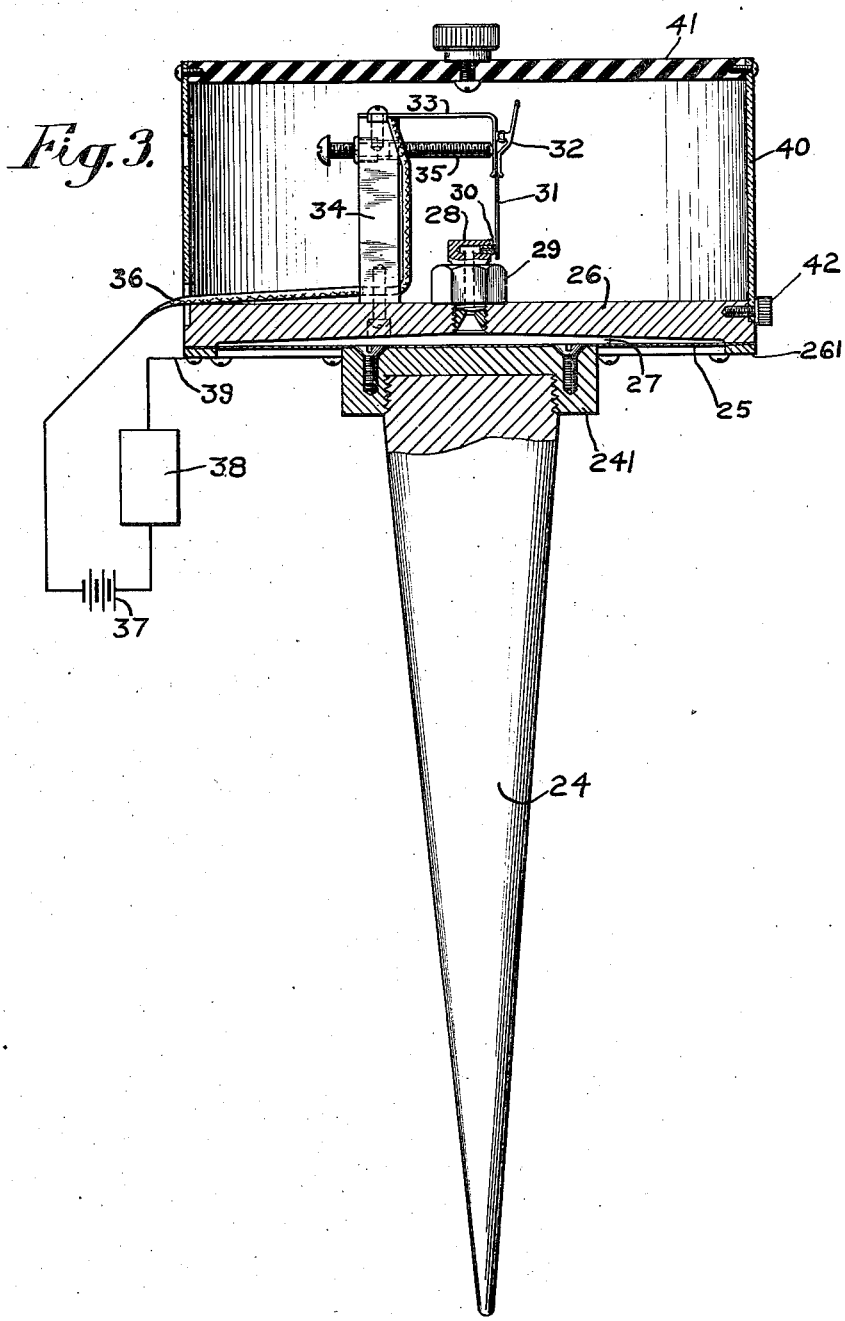
Inventor
Harvey C. Hayes
By  Attorney Patented Nov. 20, 1934

1,980,993

UNITED STATES PATENT OFFICE 1,980,993

VIBRATION DETECTOR

Harvey C. Hayes, Washington, D. C.

Application May 17, 1928, Serial No. 278,492

4 Claims. (Cl. 177—352)

(Granted under the act of March 3, 1883, as amended April 30, 1928; 370 O. G. 757)

This invention relates to devices for detecting sound or similar waves coming through the air or through some solid medium, such as the earth. Heretofore detectors designed for the above purpose have either been constructed along the principles of the microphone or have involved some sort of magneto electric construction, i. e., one in which a variation of magnetic flux cutting across a coil or similar conductor is made to induce a current therein in response to a vibration. The difficulty with devices of this character in the past has been that the electrical effects produced by virtue of the sound or other compressional waves striking the detector have been quite feeble and have required considerable amplification before being transmitted to a suitable indicating or recording apparatus, such as a galvanometer or an oscillograph. While suitable amplifying units embodying vacuum tube amplifiers have been available for the purpose, these units have been subject to the atmospheric disturbances commonly known as static. At certain seasons of the year, and particularly during storms when heavy electrical discharges take place in the atmosphere, the static effect has been so great as to render the detectors completely useless. This is for the reason that the amplifying units have served to amplify the static effects in the same ratio that the impulses set up by the detector have been amplified.

A primary object of the present invention has been to devise a suitable detector which is free from the interferences of such static conditions. To this end the present invention contemplates the creation of a sufficiently large electrical disturbance or variation of current flow upon the operation of the detector itself as to make it possible to dispense with all or most of the amplification. It will be apparent that in accomplishing this result two main advantages are obtained, the one being the elimination of interference from static and the other being the reduction in the cost of the units required for the detection and indication or recording of the sound or compressional waves.

With these and incidental objects in view, some of which will become more apparent as the description progresses, several embodiments of the invention will now be described in detail with reference to the accompanying drawings, in which Figure 1 is a general view partly in section showing the construction of one form of the novel detector, together with suitable electrical circuits associated therewith.

Figure 2 is a detail of a modified form of construction.

Figure 3 is a view similar to Figure 1 of a modified form of detector and co-operating circuit.

The essential features of the detector forming the basis of the present invention are an element sensitive to the compressional waves which it is desired to detect, a diaphragm connected to said element to partake of the movements of the latter in response to the waves detected, pneumatic means comprising an air-tight chamber of relatively small volume with relation to the diameter of the diaphragm, one side of the chamber being formed by the diaphragm, a small outlet from the chamber, and a light, flexible, electrical, contact member supported adjacent the outlet. In operation the wave responsive element will vibrate in accordance with the wave detected and this vibration will be transmitted to the diaphragm which will then alternately compress and expand the air within the chamber. As a result, small puffs of air will be emitted through the outlet against the contact element and the latter will be alternately blown away from and drawn toward the end of the outlet. Any suitable means in the way of electrical circuits may then be provided for the purpose of setting up electrical effects produced by the making and breaking of a circuit due to the vibrations of the contact member.

Referring now to Figure 1, wherein one suitable form of the detector and related circuit are disclosed, there is shown a wave responsive element 1 which is preferably of conical shape and which, when forced into the ground, is particularly suited for the detection of compressional waves transmitted through the earth. This element may be of any suitable material and dimension. It has been found that an aluminum cone, partially hollow, having a length of about thirty inches and tapering from a relatively sharp point to an upper diameter of four or five inches, is quite satisfactory. A bolt or post 2, which may be fastened in any suitable way to the upper end of the cone, is provided with means for supporting and clamping a circular diaphragm 3 at its center. For this purpose, the post 2, or a supporting element carried thereby, should be of sufficient dimension to provide an adequate supporting surface for the diaphragm and the elements connected to it, which will be mentioned hereinafter. As shown in Figure 1, the connection may include a disk 201 which may be provided with screw-threads on its edge adapted to be fitted into a screw-threaded portion at the upper open end of the casing. In Figure 2 an alternative method of securing the disk 201 in the upper end of the cone is disclosed. Thus the disk may fit freely into the opening in the cone and may be clamped by means of a series of set screws 200. The bolt 2 may be passed through an opening at the center of the disk and may be provided with a collar 202 above the disk to serve as a support for the diaphragm. Nuts 203 may be employed to clamp and lock the disk, collar, and diaphragm together on the post against another nut or the head of the bolt 204.

The diaphragm 3 which is preferably formed of thin sheet steel or similar resilient material serves to close the lower side of a relatively shallow chamber 4 which is formed between the diaphragm and an element 5, preferably of bronze, of rigid and relatively heavy construction, the under surface of the latter being formed preferably with a slight taper toward the center. The diaphragm 3 and the element 5 may, by way of example, have a diameter substantially the same as that of the upper end of the cone, and the distance between the diaphragm 3 and the element 5 may vary, for example, from one-sixteenth of an inch at the edge to three-sixteenths of an inch at the center. It is to be understood, however, that the dimensions specified are merely given for the sake of illustration and are not to be regarded as restrictive of the invention. In general, within certain limits it is preferable for the sake of sensitivity to employ a diaphragm of relatively large diameter and an air chamber which is relatively shallow.

Any suitable means may be employed for the purpose of securing the diaphragm to the element 5 in such a way as to form the chamber 4. This means may consist of a clamping ring 31 which is threaded to fit corresponding threads formed inside of a flange of the element 5. Suitable gaskets 32 formed preferably of copper should be placed on either side of the diaphragm as the latter is clamped into position in order to form a substantially air-tight seal along the edge of the diaphragm. A small tube 6 is fitted into an opening in the element 5 at its center and is provided with a small passage which may be of any suitable dimension, as, for example, one-eighth of an inch in diameter. Except for the passage in the tube 6, the chamber formed between the diaphragm 3 and the element 5 should be substantially air-tight.

A cover 7 is preferably employed to enclose the tube 6 and parts co-operating therewith, this cover being secured to the element 5 as by means of bolts 71 passing through a flange thereof and preferably having sufficient weight to serve as an inertia member in conjunction with the element 5. A small bracket 8 supported by means of a screw 81 from the cover 7 is adapted to have clamped or soldered thereto a thin contact element 9 suspended adjacent to the outlet end of the tube 6. This contact element may be formed of any thin metal and may be in the form of a small strip of goldleaf or platinum, although a strip of ordinary tinfoil about one-eighth of an inch in width has been found very satisfactory in practice. Normally the lower end of the element 9 rests against the outlet end of the tube 6 and practically closes the latter. The support for the strip 9 is preferably insulated from the cover 7 as by means of a porcelain sleeve 82 through which the screw 81 passes and a suitable electrical connection is provided from the strip through the bracket 8 to a binding post formed by the screw and a nut 10. From the latter a conductor 11 serves to form an electrical connection to the grid 12 of a vacuum tube. Another binding post or equivalent element 13 which passes through the cover 7 and is in direct engagement therewith may be in electrical conductivity with the latter as well as with the element 5. It will be understood that the tube 6 which is also formed of metal will by this means be electrically connected to the binding post 13. From the latter a conductor 14 may be led to a battery 15, the opposite terminal of which is connected to the filament 16 of the vacuum tube, this filament being heated by current from a battery 161. The plate circuit of the vacuum tube may be connected in any suitable way to the primary coil 17 of a transformer; thus the plate 18 of the tube may be connected to one end of the coil 17 while the filament may be connected through a battery 19 to the opposite end of the coil. The secondary coil 20 of the transformer may be connected directly to the terminals of a galvanometer or oscillograph 21 or may be connected to any suitable form of amplifier 22 which in turn is connected to the oscillograph 21.

Normally a circuit is completed to the grid 12 of the vacuum tube from the source of current 15 by virtue of the engagement of the strip 9 with the outlet end of the tube 6. The battery 15 will be so connected in this circuit as to have its negative terminal toward the grid and the positive toward the filament of the tube so that a negative charge will normally be imposed upon the grid.

The operation of the device may be explained briefly as follows: When the wave responsive element 1 is vibrated upon the receipt of a compressional wave, its movement will be transmitted to the diaphragm 3 which will then compress the air within the chamber 4, since the element 5 remains stationary by its inertia, and will cause a puff to be emitted through the tube 6 against the element 9 and thereby break the contact between the latter and the tube. This will then remove the negative charge which has been imposed upon the grid 12 and will vary the current flowing in the plate circuit and hence in the primary winding 17 of the transformer. It will be understood that the presence of a negative charge on the grid tends to decrease the flow of current through the plate circuit whereas the removal of the negative charge will then cause a sudden increase in this flow of current. In practice, it has been found that the strip 9 is not blown to any appreciable extent away from the tube 6 but only enough to break or materially vary the conductivity of the circuit from the battery 15. Upon the return movement of the diaphragm 3, a suction will be generated in the tube 6 and this has been found sufficient to quickly draw the contact element 9 against the tube again. Therefore, a sustained vibration of the wave responsive element 1 has been found to produce a series of vibrations of the contact element 9 which has brought about a series of fluctuations in the current in the plate circuit of the vacuum tube. These fluctuations in the current passing through the primary winding 17 will, of course, induce corresponding electrical effects in the secondary winding 20 which may be indicated or recorded by the galvanometer or oscillograph 21. If a recording oscillograph is employed the record produced upon the usual photographic film will be found to assume the form of a wavy line quite closely approximating the form of the wave which produced the vibration detected.

In Figure 3 there is shown a modified form of detector which embodies a number of changes in construction over the form disclosed in Figure 1. It will be understood that any one or more of these changes as well as numerous others may be adopted and embodied in the actual construction of the detector as desired. As shown in this figure, the vibration responsive element assumes the form of a relatively slender tapered spike 24 at the upper end of which the diaphragm 25 may be carried in any suitable way; for example, this diaphragm may be secured as by means of screws to a cap 241 having internal threads adapted to engage corresponding threads at the upper end of the spike. It will be apparent that if the hollow cone type of sound responsive element such as is shown in Figure 1 were adopted, the cap 241 could be secured in the upper end thereof by either of the methods shown in Figures 1 and 2. The diaphragm 25 forms the lower side of a suitable air chamber 27 formed between the diaphragm and an upper relatively heavy inertia block 26. For the purpose of securing the diaphragm to the inertia block, a clamping ring 261 may be employed and suitable screws may be passed through the latter and the diaphragm into the inertia block. At the center of the block 26 a screw-threaded opening is provided and into this is fitted a tube 28 having a small L shaped opening running through its center and out toward one side at the top. This tube will preferably be screwed into the block 26 and may be locked in position by means of a nut 29. A small nozzle 30 is inserted in the horizontal portion of the opening through the tube and in front of this nozzle there is suspended a contact element 31 formed either of goldleaf or some other suitable light foil about ⅛" in width. This foil strip may be suspended by means of a clamp 32 mounted on a supporting bracket 33 secured to a post 34. The latter in turn may be secured to the block 26 by any suitable means such as the screws shown. A set screw 35 passing through the post 34 may be provided for the purpose of adjusting the clamp 32 to suspend the strip 31 at the proper point. An insulated conductor or cable 36 is connected at one end to the bracket 33, which is formed of some electrical conductor and is passed through a suitable opening in the post 34, which is preferably formed of some non-conducting material such as bakelite. The opposite end of the wire 36 may be connected to one terminal of a source of electricity, such as the battery 37, the opposite terminal of which may be connected to a galvanometer or oscillograph 38. Another connection may then be made from the opposite terminal of the oscillograph or other indicating or recording device to any suitable point on the block 26 so that an electrical connection will be made to the nozzle 30. It will be clear that so long as the strip 31 engages the end of the nozzle, an electrical circuit will be completed through the galvanometer or oscillograph, but this circuit will be broken by the generation of a puff of air through the nozzle 30 upon relative movement of the diaphragm 25 and the block 26. A casing 40 is preferably provided to enclose the parts supported by the block 26 and this casing may be formed of any suitable material such as bakelite or, if desired, it may be formed of celluloid provided at the upper end with an enclosing disk 41 of bakelite or similar material. The lower rim of the cover 40 preferably fits a flange or shoulder formed on the block 26 and these parts may be secured together by means of a screw 42. As shown, suitable openings are provided in the side of the cover to permit the passage of the wire 36 and the insertion of a screw-driver for adjusting the set screw 35.

Obviously numerous other changes might be made in the details of construction of the detector or the arrangement of the electrical circuit in which it is employed without departing from the spirit of the present invention. Several modifications have been disclosed herein merely for the purpose of illustrating preferred or suitable embodiments of the invention. It is desired to be limited only by the scope of the claims which follow.

The invention herein described may be manufactured and used by or for the Government of the United States for governmental purposes without the payment to me of any royalty thereon or therefor.

What I claim is:

1. In a device of the class described a wave responsive element adapted to be mounted in a medium so as to be movable with said medium in response to vibrations passing therethrough, a diaphragm a portion of which is secured to said element so as to vibrate therewith, an inertia element mounted on another part of said diaphragm, said inertia element and said diaphragm being so shaped as to form an enclosed air chamber, an electrically conductive outlet tube leading from said chamber, and an electrical contact element adapted to engage said outlet and to be blown out of engagement by puffs of air from said chamber.

2. In a device of the class described, a vibration responsive element adapted to be mounted in a medium so as to be movable with said medium in response to vibrations passing therethrough, a circular diaphragm the center of which is secured to said element so as to vibrate therewith, an inertia element mounted on the rim of said diaphragm, said inertia element and said diaphragm being so shaped as to form an enclosed air chamber, an electrically conductive nozzle leading from said air chamber, and a contact strip adapted to engage said nozzle and to be blown out of engagement by puffs of air from said chamber.

3. In a device of the class described, a vibration responsive element adapted to be mounted in a medium so as to be movable with said medium in response to vibrations passing therethrough, an inertia member having a substantially concave face, a flexible diaphragm attached to said inertia member over said concave face so as to form with said inertia member an air chamber, a connection between said vibration responsive element and said diaphragm, the arrangement being such that there may be slight relative movement between said vibration responsive element and said inertia member, an electrical circuit, a circuit making and breaking device connected in said circuit, and means including a tubular passage leading from said chamber to said circuit making and breaking device for actuating said device in response to relative movement of said vibration responsive element and said inertia member.

4. In a device of the class described a vibration responsive element adapted to be inserted in the ground so as to be movable in response to vibrations passing through the ground, a flexible diaphragm secured at its center to the top of said vibration responsive element, an inertia element located above and secured to said diaphragm around its periphery so that said inertia element will be supported by said diaphragm, said inertia element and said diaphragm being so shaped as to form an enclosed air chamber, an electrical circuit making and breaking device, and a conduit connecting said circuit making and breaking device with said air chamber for conveying puffs of air generated by relative movement between said vibration responsive element and said inertia element to actuate said circuit making and breaking device.

HARVEY C. HAYES.